A. STOLTENBERG.
VEGETABLE CUTTER.
APPLICATION FILED APR. 14, 1915.

1,157,448.

Patented Oct. 19, 1915.
5 SHEETS—SHEET 1.

WITNESSES:

INVENTOR.
Adolph Stoltenberg.
BY
ATTORNEY.

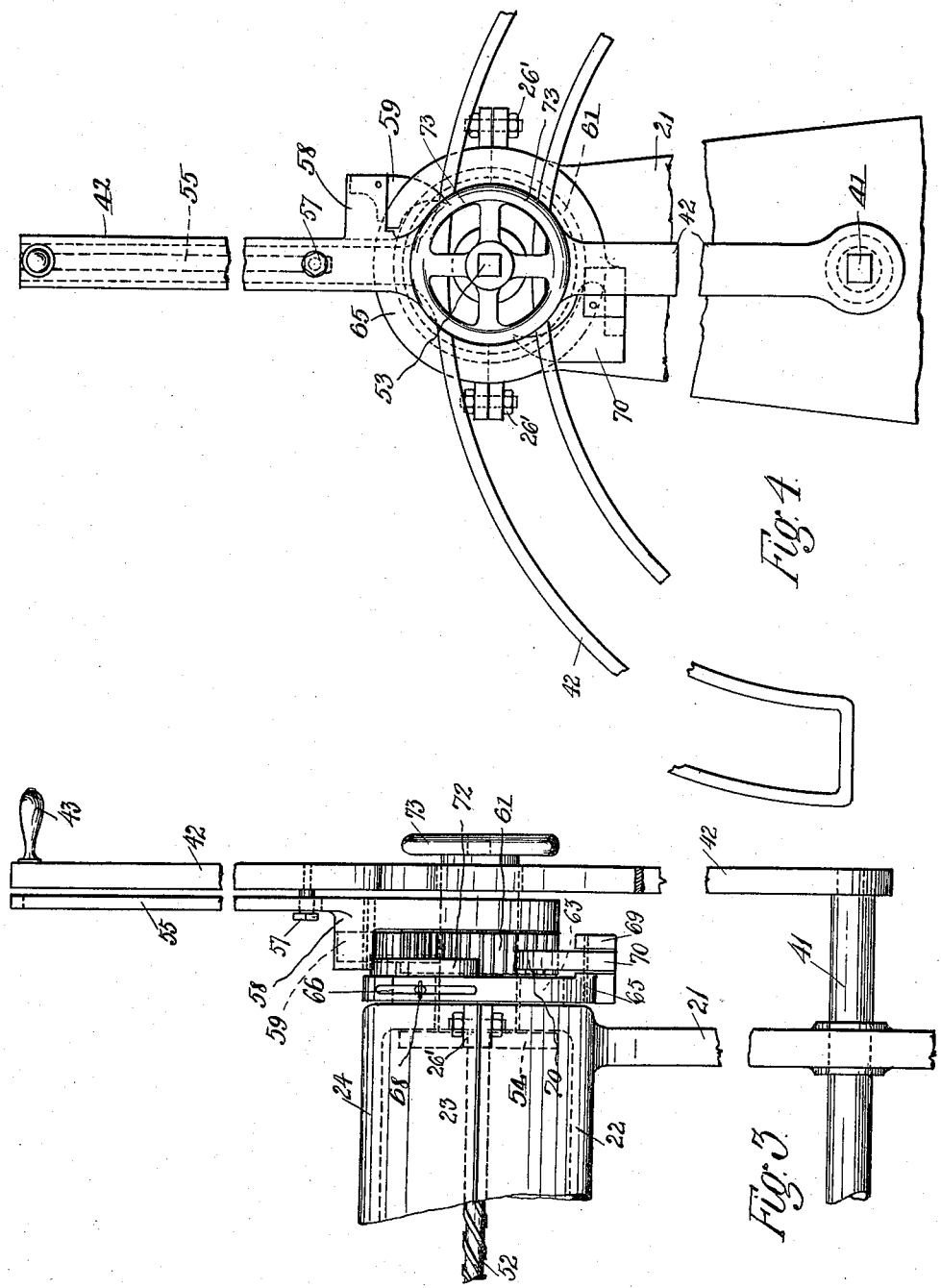

A. STOLTENBERG.
VEGETABLE CUTTER.
APPLICATION FILED APR. 14, 1915.

1,157,448.

Patented Oct. 19, 1915.
5 SHEETS—SHEET 4.

WITNESSES:

INVENTOR.
BY Adolph Stoltenberg.
ATTORNEY.

A. STOLTENBERG.
VEGETABLE CUTTER.
APPLICATION FILED APR. 14, 1915.

1,157,448.

Patented Oct. 19, 1915.
5 SHEETS—SHEET 5.

WITNESSES:
Aladar Hamburger
J. M. Jiner

INVENTOR.
Adolph Stoltenberg
BY
Alexander Piner
ATTORNEY.

UNITED STATES PATENT OFFICE.

ADOLPH STOLTENBERG, OF NEW YORK, N. Y.

VEGETABLE-CUTTER.

1,157,448.   Specification of Letters Patent.   Patented Oct. 19, 1915.

Application filed April 14, 1915. Serial No. 21,288.

*To all whom it may concern:*

Be it known that I, ADOLPH STOLTENBERG, a subject of the Emperor of Germany, residing at New York, in the county of New York and State of New York, have invented new and useful Improvements in Vegetable-Cutters, of which the following is a specification.

This invention relates to a vegetable cutter and has as its principal object to provide a device by means of which different kinds of vegetables, such as potatoes, onions, carrots, etc., may be cut up into pieces of various shapes and sizes. With my device this object can be accomplished in a clean and proper way, without crushing, so that the vegetables cut up and put into water may be preserved for use on the next day, without detriment to their outward appearance or taste which cannot be done when the vegetables are crushed in the process of cutting them up as is the case in existing machines.

A further object of my invention is to provide a device of the character described which may be handled by any unskilled person.

A still further object is the elimination of waste in material.

Figure 1:
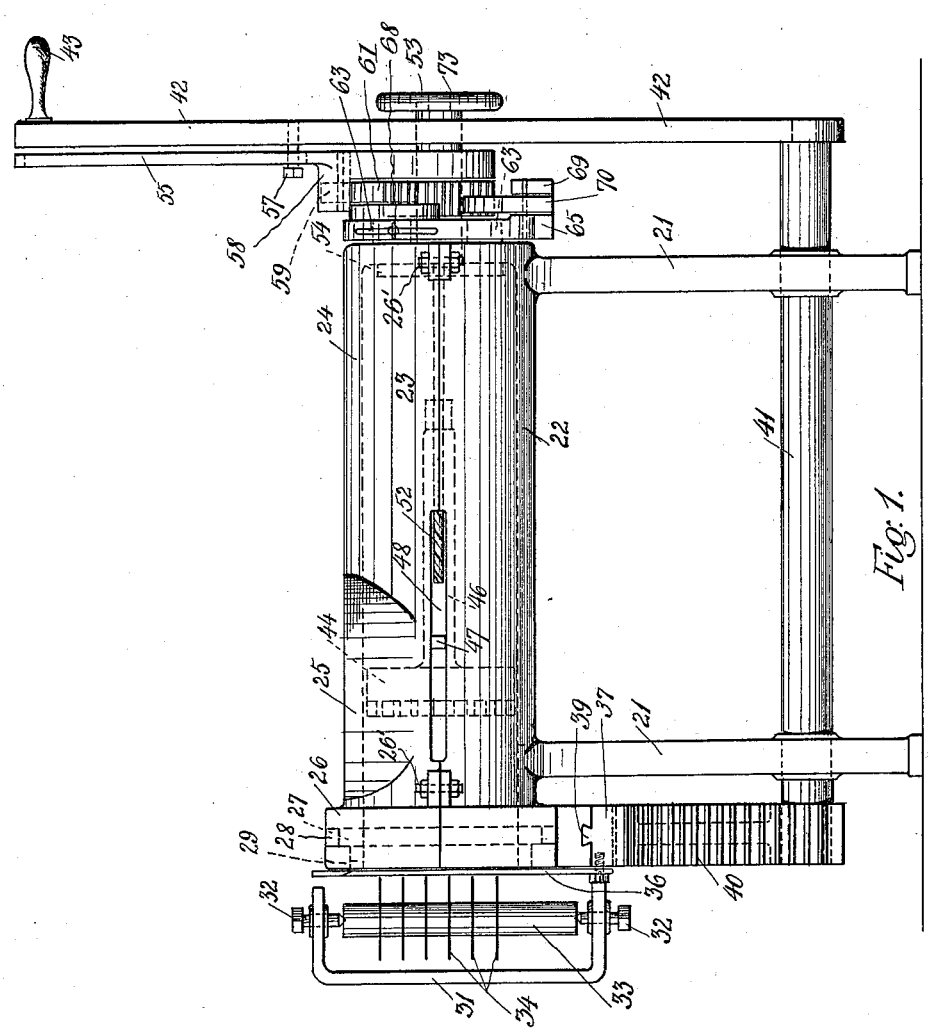
Figure 2:
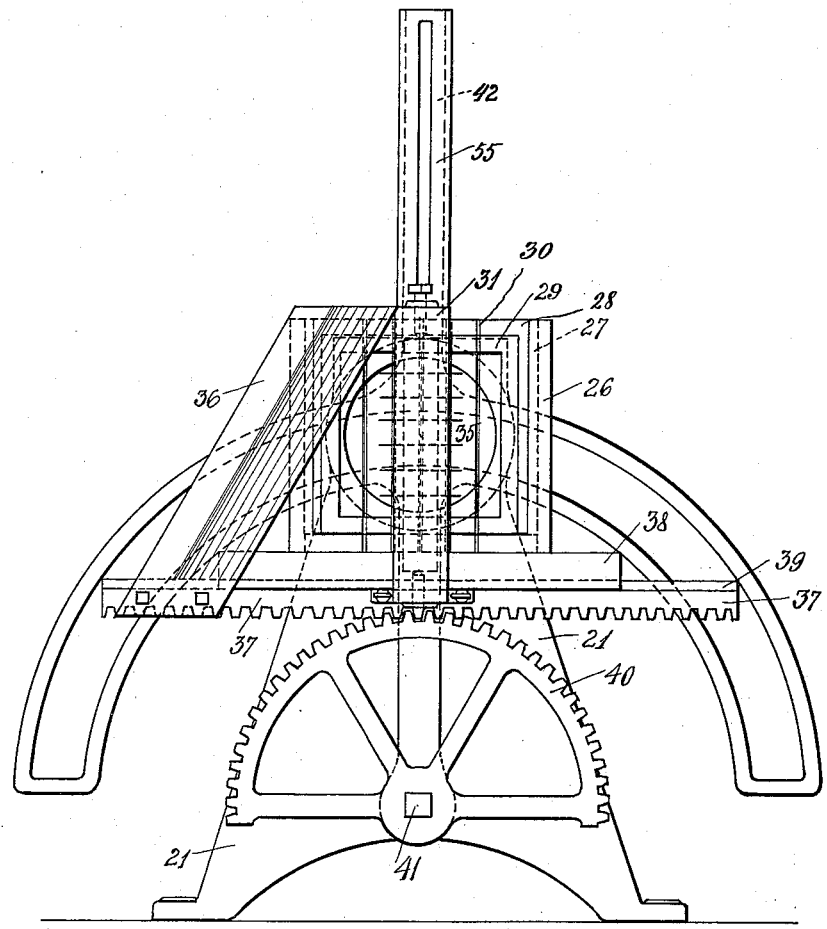
Figure 5:
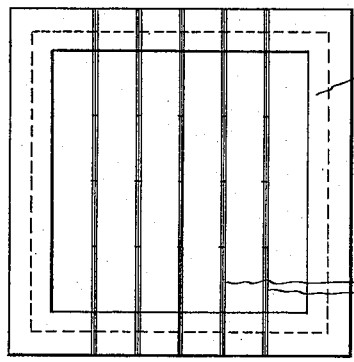
Figure 6:
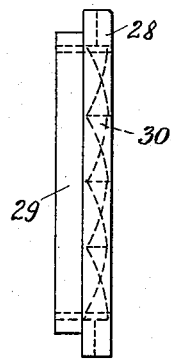
Figures 7, 8:
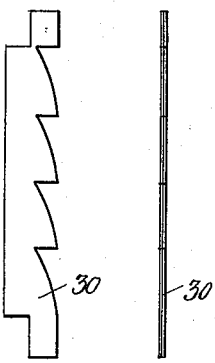
Figures 9, 10:
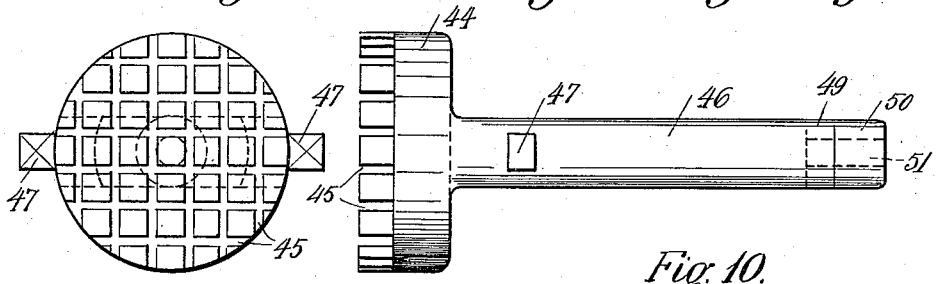
Figures 11, 12:
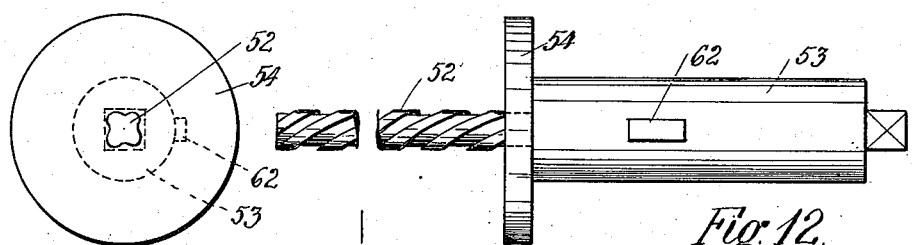
Figure 13:
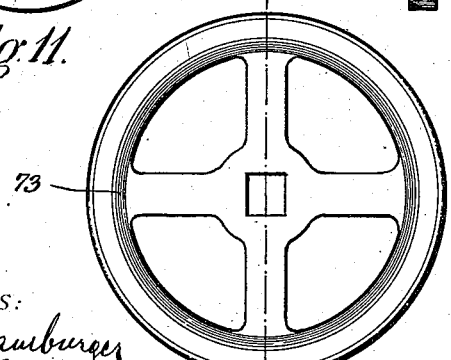
Figure 14:
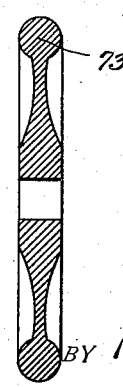
Figure 15:
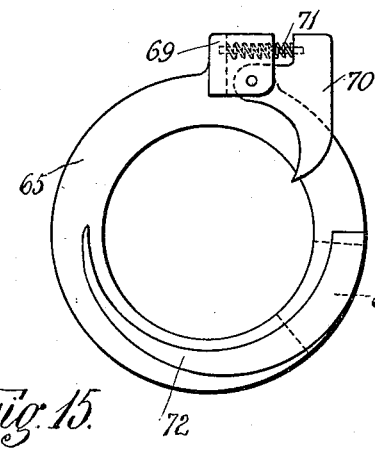
Figure 16:
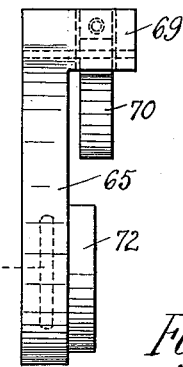
Figure 17:
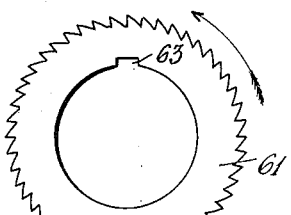
Figure 18:
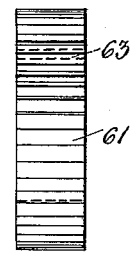
Figure 19:
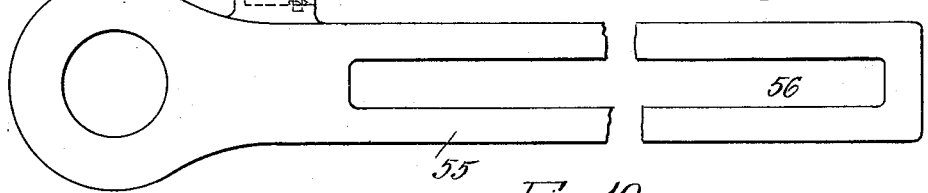
Figure 20:
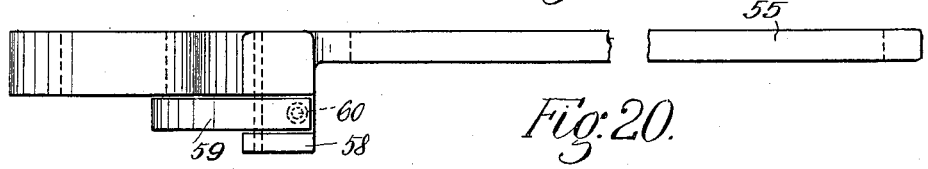

With the foregoing and other objects in view, my invention consists in the particular arrangement, combination and construction of parts, more specifically described hereinafter and illustrated in the accompanying drawings, in which:

Figure 1 is a side elevational view of my device. Fig. 2 is a front elevational view thereof. Fig. 3 is a fractional side elevational and Fig. 4 a fractional rear elevational view of the same on an enlarged scale. Figs. 5 and 6 are front and side elevational views, respectively, of a part of my device. Figs. 7 and 8 show a detail of the part illustrated in Figs. 5 and 6, in side and front elevation, respectively. Figs. 9 and 10 are front- and side-elevational views, respectively, of another part of my device. Figs. 11 and 12 are similar views of still another part of same. Fig. 13 is a rear elevational view and Fig. 14 a vertical cross-section of a handwheel forming part of my device. Figs. 15 and 16, 17 and 18, 19 and 20 are rear- and side-elevational views, respectively, of different parts of my device.

The same reference character designates the same part throughout the several views.

Referring more particularly to the drawings, 21—21 are pedestals formed integrally with the semi-cylindrical lower part 22 of a casing 23, completed by an upper part 24 of substantially the same shape, but having, near its fore end, a substantially semi-spherical hopper 25 formed in it, through which the vegetables are fed into the cutter. The two parts 22 and 24 of the casing 23 are secured together by means of bolts and nuts as is obvious from the drawings and is best seen at 26' in Fig. 4.

The front end of the casing 23 is open and has a square shouldered portion 26 formed thereon, having a vertical groove 27 in each side (Figs. 1 and 2), adapted to engage the flanges 28 of a square frame or knife-holder 29 carrying a plurality of saw-toothed knives 30 set in it alternately with teeth pointing downward and upward, as best seen in Fig. 6. The knife-holder 29 may be inserted into the shouldered portion 26 with the knives 30 horizontal or vertical, for purposes which will hereinafter appear.

Mounted at the front of the portion 26, near the longitudinal center of its lower edge, is a vertical bracket 31 having two horizontal arms and carrying, removably secured between two set screws 32 journaled into them, a vertical cylinder 33 provided with a plurality of rigid horizontal cutting-disks 34 in front of and close to the opening 35 of the casing 23. An oblique knife 36 is further provided in front of the opening 35, adapted to slide laterally between same and the cutting-disks 34 and secured to a horizontal rack 37 carried by a horizontal bar 38 formed at the bottom of the portion 26. The rack 37 has a dovetailed tongue 39 formed at its top, adapted to slide in a correspondingly shaped groove formed in the bottom of the bar 38, all along its length.

The rack 37 is reciprocatingly actuated by a toothed segment 40 rigidly mounted on the fore end of a shaft 41 journaled into the pedestals 21—21, on the rear end of which is rigidly mounted a crank-lever 42 having a handle 43 near its upper end by means of which the crank-lever 42 may be swung to and fro, thereby actuating the whole device, as will hereinafter appear.

Within the casing 23 I provide a disk-shaped pusher 44 shown in detail in Figs. 9 and 10, having formed, in its front surface, both horizontal and vertical notches 45 registering with the knives 30 in either of the two alternative positions in which same may be inserted in the cutter. The pusher 44 has integrally formed thereon two slide-bars 46 projecting backward therefrom, one on either side, their outer surface corresponding in shape to the inner surface of the walls of the casing 23 against which they are lying and in which they are guided by means of square lugs 47 sliding in grooves 48 formed, one on either side, in the casing 23. The rear ends of the slide-bars 46 are connected by an integral cross-piece 49 having formed at its longitudinal center, projecting backward therefrom, a hub 50. A spirally threaded bore 51 is provided in the hub 50 and the cross-piece 49, adapted to receive therein and be engaged by a spiral worm 52 carried by the front end of a shaft 53 journaled in the rear end of the casing 23 and projecting therethrough. The shaft 53 has, adjacent to the inner surface of the rear wall of the casing 23, a flange or washer 54 serving to keep it in place. Thus when the shaft 53 is rotated in one or the other direction, the worm-gear will cause the pusher 44 to move back or forth, as the case may be.

On the part of the shaft 53 which projects outward of the casing 23 is rotatably mounted a lever 55 having a longitudinal slot 56 made in its stem, engaged by a pin 57 secured to the stem of the crank-lever 42. Thus when the latter is moved to and fro, the lever 55 is actuated thereby in an obvious manner. On the lever 55 is formed, near its hub-portion, a projection 58 to which is hingedly attached a pawl 59 kept in engagement, by means of a spring 60, with a ratchet-wheel 61 rigidly attached to the shaft 53 by means of a tongue 62 and groove 63. The casing 23 has, at its rear end, a reduced portion 64 on which is mounted a ring 65 provided with a slot 66 through which projects a pin 67 threaded at both ends, one end being screwed into the reduced portion 64 and the other adapted to receive thereon a winged nut 68. Owing to this arrangement, the position of the ring 65 on the reduced portion 64 is susceptible of variation within certain limits the purpose of which will be set forth hereinafter.

The ring 65 has hingedly attached to a projection 69 thereof a pawl 70 normally kept in engagement with the ratchet wheel 61 my means of a spring 71. The ring 65 has also formed on its rear surface a tapering projection 72 overhanging the ratchet wheel 61 and so placed in respect to the pawl 59 that the latter is forced to mount its declivity and thus get out of engagement with the ratchet wheel 61 when traveling over same in the direction indicated by an arrow in Fig. 17. When traveling in the contrary direction, the pawl 59 engages the ratchet wheel 61 only when it gets off the projection 72. Now, as the position of the ring 65 in respect to the pawl 59 is susceptible of modification by means of the winged nut 68 and associated mechanism, there is a certain latitude given in determining at what part of the circumference of the ratchet wheel 61 the pawl 59 should engage it at each movement of the lever 55 whereby the extent of rotation of the ratchet wheel 61 and of the shaft 53 on which it is rigidly mounted, may be regulated. It will be obvious from the foregoing that by moving the ring 65 to different positions in respect to the pawl 59 the distance of the forward thrust of the pusher 44 at each swing of the lever 42 (carrying with it the lever 55) may be regulated.

As will be seen in Fig. 4, the crank lever 42 is formed, at about its longitudinal center, into a double arc extending right and left, thereby forming a slot within which the shaft 53 is comprised so as not to interfere with the operation of the crank lever 42.

A hand-wheel 73 is rigidly mounted on the rear end of the shaft 53, for the purpose of rotating the latter in a sense contrary to that produced by the actuation of the lever 55 and thus move the pusher 44 backward when required. The pawl 70 which normally prevents the shaft 53 to be turned backward, must be forced out of engagement with the ratchet wheel 61 when this hand wheel 73 is actuated for bringing the pusher 44 back.

The operation of my device is as follows: The vegetables are fed into the casing 23 through the hopper 25 when the pusher 44 is in a position at the rear of the hopper. The crank-lever 42 is then swung to and fro by the handle 43 which causes the ratchet-coupling described to rotate the shaft 53 and the spiral worm 52 attached to it, thereby moving the pusher 44 forward in an obvious manner. The vegetables will thereby be pushed first against the knives 30 and after passing through them, against the cutting disks 34, whereafter the intermediate oblique knife—reciprocatingly actuated by the toothed segment 40 in the manner before described—will cut in transversely. As the knives 30 are adapted to enter the notches made in the front surface of the pusher 44, the latter can, by successively being actuated, be moved quite up to the front opening of the casing 23 and thus push out the entire piece of vegetable from same. When this is done, the pusher 44 is simply moved back into its first position by turning the hand-wheel 73.

By arranging the knives 30 vertically or horizontally and by removing or leaving in place the cylinder 33 with the cutting disks 34 and of the oblique knife 36, the vegetables may be cut up into a very numerous variety of shapes and sizes. The shape may further be variegated by providing frames 28 with diagonally arranged knives 30, or with knives bent in different ways so as to produce any desired fancy shape of the finished product. It will also be understood that by regulating the extent of the forward thrust of the pusher 44 at each movement of the levers, I regulate the size to which the vegetables are cut up by the oblique knife 36.

The fact that the vegetables are first pressed against one set of knives and then against the other, prevents their being crushed as is the case when they are pressed simultaneously against two sets of transverse knives. The pressure is further diminished by the formation of saw-teeth in the knives 30 and by alternating them with teeth pointing up- and down-ward, so that they enter the vegetables gradually and not with the whole edge at the same time. The circular shape of the edges of the cutting disks 34 serves the same purpose.

It is understood that while I have thus described and shown the preferred form of embodiment of my invention, I do not want to be limited to the mechanical details thereof, but may resort to such alterations and modifications as come within the scope of the claims hereunto appended.

I claim:

1. A vegetable-cutter comprising, in combination, a casing, a set of interchangeable cutting means adapted to be removably inserted in the front opening of said casing, another set of cutting means removably mounted in front of said opening, a detachably mounted reciprocating knife adapted to cut in transversely between said first and second-mentioned sets of cutting means, means for feeding vegetables into said casing, means for pushing same against said cutting means in succession and means actuating said pushing means simultaneously with said reciprocating knife.

2. A vegetable-cutter comprising, in combination, a casing, a set of interchangeable cutting means adapted to be removably inserted in the front opening of said casing, another set of cutting means removably mounted in front of said opening, a detachably mounted reciprocating knife adapted to cut in transversely between said first- and second-mentioned sets of cutting means, means for feeding vegetables into said casing, means for pushing same intermittently against said cutting means in succession, means actuating said pushing means simultaneously with said reciprocating knife, and means for regulating the extent of the forward thrust of said pushing means at each successive operation.

In testimony whereof I have hereunto set my signature in the presence of two witnesses.

ADOLPH STOLTENBERG.

Witnesses:
 OTTO BUSECK,
 ALEXANDER DENES.

Copies of this patent may be obtained for five cents each, by addressing the "Commissioner of Patents, Washington, D. C."